UNITED STATES PATENT OFFICE.

KONRAD DELBRÜCK AND KURT MEISENBURG, OF ELBERFELD, GERMANY, ASSIGNORS TO FARBENFABRIKEN VORM. FRIEDR. BAYER & CO., OF ELBERFELD, GERMANY, A CORPORATION OF GERMANY.

SUBSTANCE SIMILAR TO CAOUTCHOUC AND PROCESS OF MAKING SAME.

1,076,196.  Specification of Letters Patent.  Patented Oct. 21, 1913.

No Drawing.  Application filed December 30, 1912.  Serial No. 739,408.

*To all whom it may concern:*

Be it known that we, KONRAD DELBRÜCK and KURT MEISENBURG, doctors of philosophy, chemists, citizens of the German Empire, residing at Elberfeld, Germany, have invented new and useful Improvements in Substances Similar to Caoutchouc and Processes of Making Same, of which the following is a specification.

In the *Journal für Praktische Chemie*, vol. 64, p. 109/110 Kondakow described a polymerization product obtained by autopolymerization of beta-gamma-dimethylerythrene. This product is totally different from the caoutchouc substance obtained by heating beta-gamma-dimethylerythrene. It is a white crumbly mass which so quickly changes in the air that it can be rolled into sheets only if it is subjected to this process immediately after its production. The sheets thus obtained however can likewise only be kept for a very short time and quickly resinify in the air so that they are useless for technical purposes. It has now been found that this substance can be converted into a stable and technically very valuable product which can be used as a substitute for caoutchouc or gutta-percha, by treating it with tannin.

In order to illustrate the new process more fully the following example is given, the parts being by weight:—100 parts of the white product of polymerization obtained from beta-gamma-dimethylerythrene according to the process described by Kondakow are mixed with 6 parts of tannin. A caoutchouc like stable product is obtained.

We claim:—

1. The process of producing a stable caoutchouc-like substance from an unstable caoutchouc-like autopolymerization product which comprises treating the same with tannin.

2. The process of producing a stable caoutchouc-like substance which comprises treating an unstable autopolymerization product of beta-gamma-dimethylerythrene with tannin.

3. The process of producing a stable caoutchouc-like substance which comprises treating an unstable autopolymerization product of beta-gamma-dimethylerythrene with about 6% of its weight of tannin.

4. As a new product a stable caoutchouc-like substance comprising beta-gamma-dimethylerythrene caoutchouc and tannin.

5. As a new product a stable caoutchouc-like substance the caoutchouc-like autopolymerization product of beta-gamma-dimethylerythrene and tannin.

6. As a new product a stable caoutchouc-like substance the caoutchouc-like autopolymerization product of beta-gamma-dimethylerythrene and about 6% of its weight of tannin.

In testimony whereof we have hereunto set our hands in the presence of two subscribing witnesses.

KONRAD DELBRÜCK. [L. S.]
KURT MEISENBURG. [L. S.]

Witnesses:
HELEN NUFER,
ALBERT NUFER.